United States Patent [19]
Imaeda et al.

[11] Patent Number: 6,129,864
[45] Date of Patent: *Oct. 10, 2000

[54] PROCESS FOR PRODUCING OPTICAL WAVEGUIDE SUBSTRATE

[75] Inventors: Minoru Imaeda; Tatsuo Kawaguchi, both of Nagoya; Takahiro Inoue, Gifu; Masatomo Yamauchi, Haguri-Gun, all of Japan

[73] Assignee: NGK Insulators, Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/882,232

[22] Filed: Jun. 25, 1997

[30] Foreign Application Priority Data

Jun. 26, 1996 [JP] Japan .................................. 8-165627

[51] Int. Cl.[7] ...................................... B29O 11/00
[52] U.S. Cl. ...................... 264/1.21; 264/1.24; 264/1.7; 264/2.7; 385/131
[58] Field of Search .................................. 264/1.24, 1.21, 264/2.7, 1.7; 385/14, 141, 142, 130, 131

[56] References Cited

U.S. PATENT DOCUMENTS 5,363,462  11/1994  Hung et al. .
5,369,722  11/1994  Heming et al. .
5,759,481   6/1998  Pujari et al. .............................. 264/655

FOREIGN PATENT DOCUMENTS 0 409 339 A1   1/1991  European Pat. Off. .
0 803 747 A2  10/1997  European Pat. Off. .
6-317718      11/1994  Japan .

OTHER PUBLICATIONS

Patent Abstracts of Japan vol. 095, No. 002, Mar. 31, 1995—& JP 06 317718A (Japan Steel Works Ltd: The) Nov. 15, 1994.

*Primary Examiner*—Mathieu D. Vargot
*Attorney, Agent, or Firm*—Wall Marjama Bilinski & Burr

[57] ABSTRACT

A process for producing an optical waveguide substrate including a ridge-shaped structural portion containing at least an optical waveguide, which process including the steps of forming an optical waveguide-forming layer on a substrate body to prepare a substrate workpiece, and forming said ridge-shaped structural portion at said substrate workpiece by grinding.

10 Claims, 3 Drawing Sheets

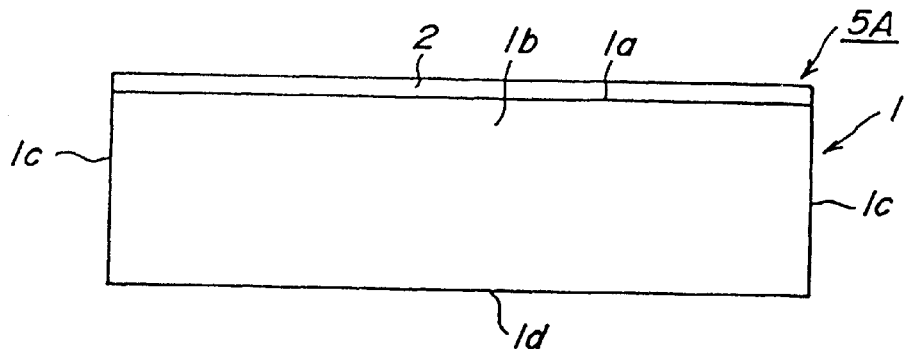
FIG_1a
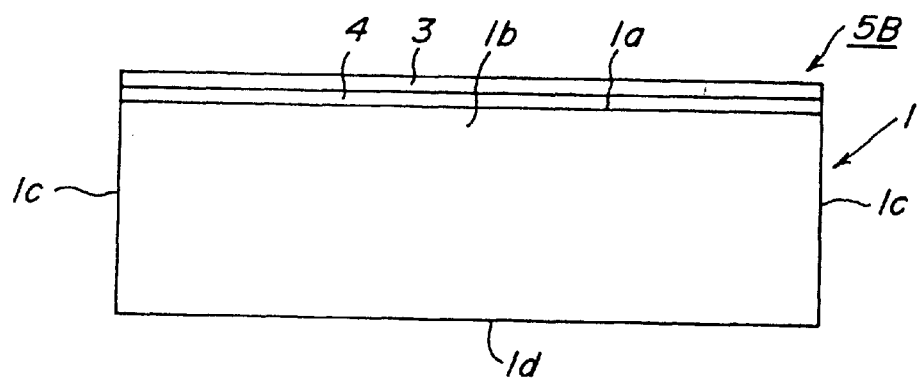
FIG_1b
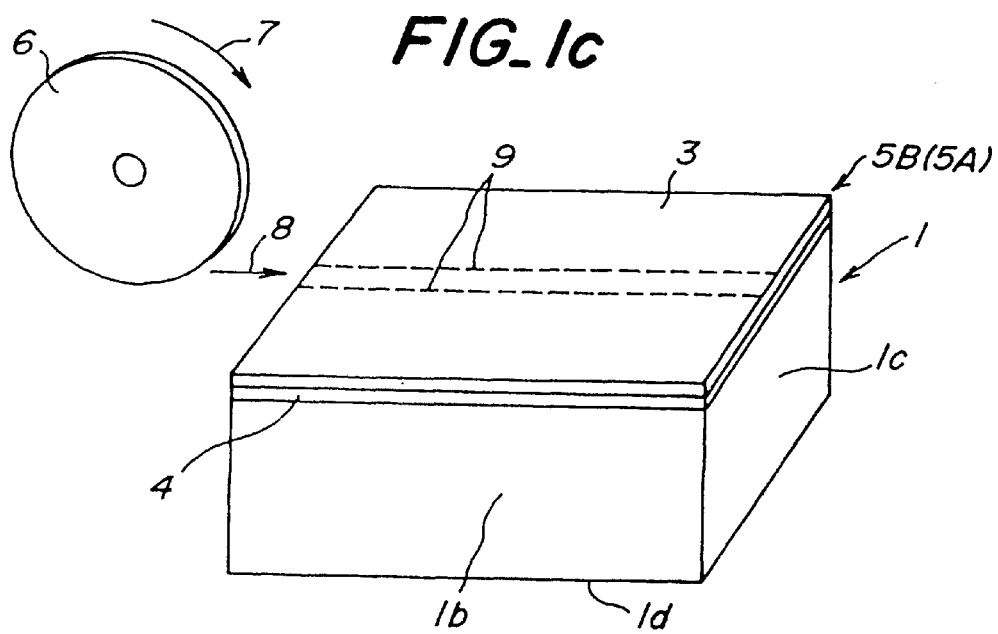
FIG_1c

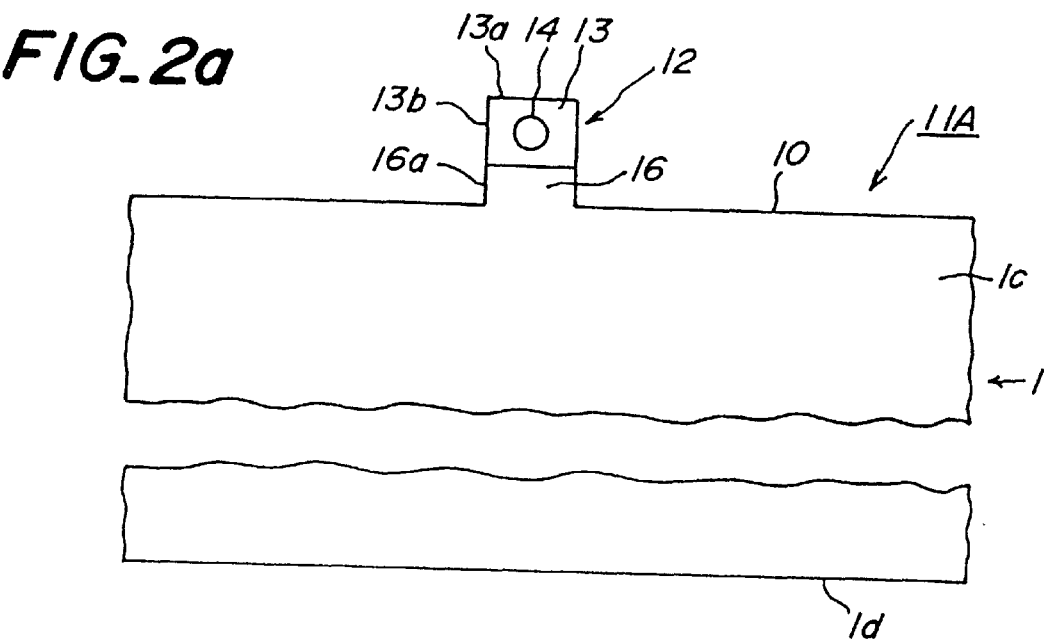
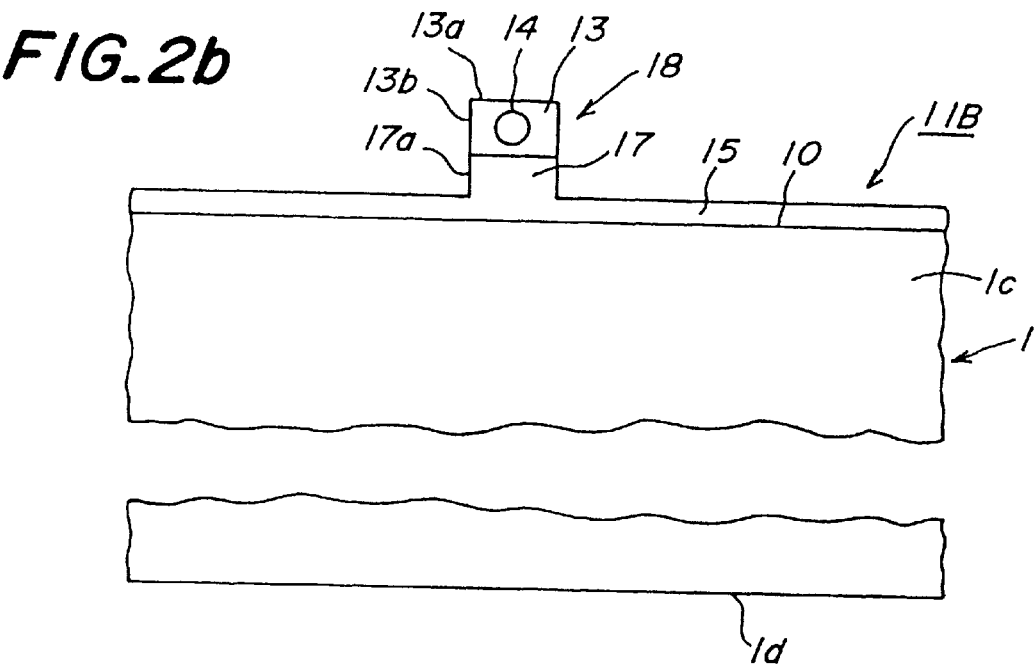

FIG_3a
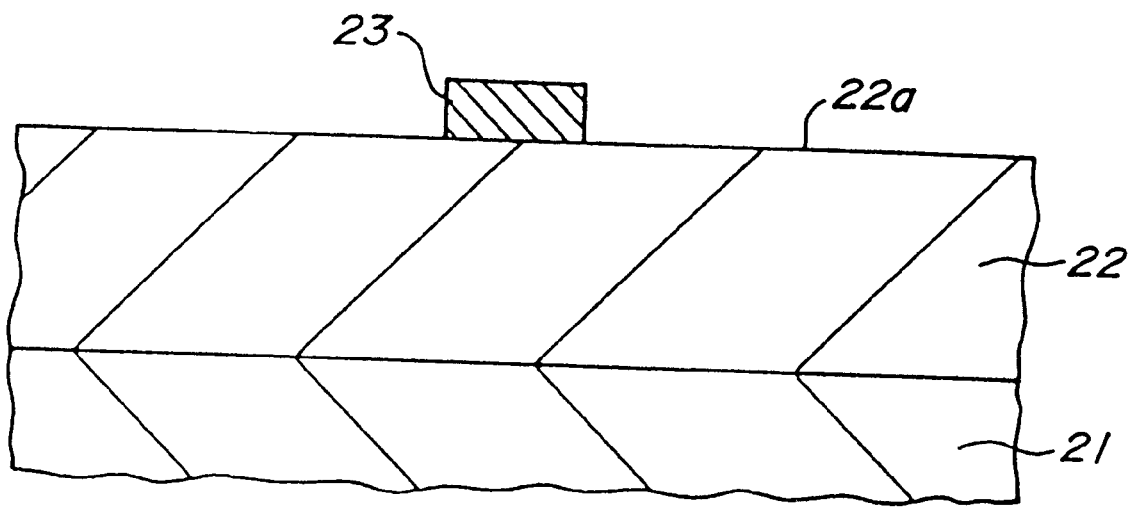
FIG_3b
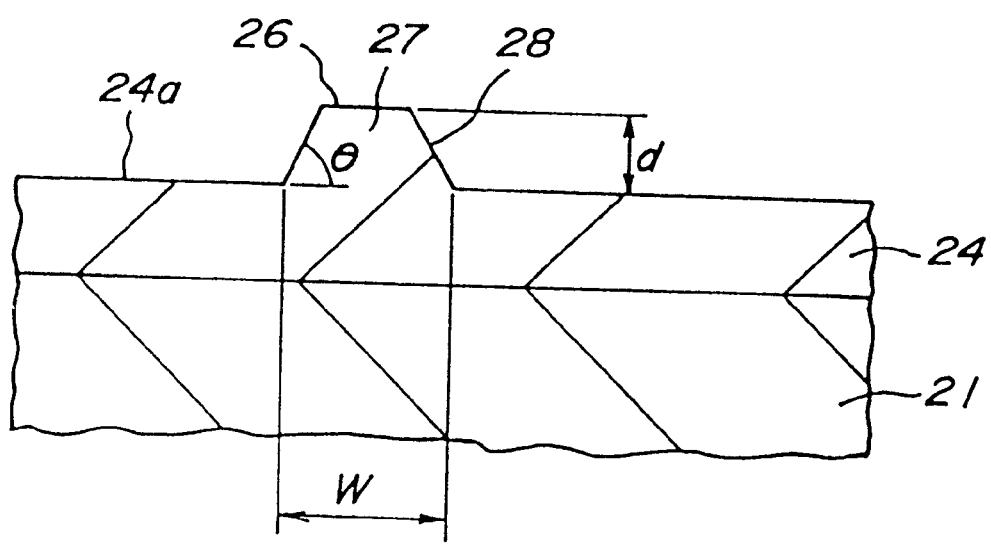

PROCESS FOR PRODUCING OPTICAL WAVEGUIDE SUBSTRATE

BACKGROUND OF THE INVENTION (1) Field of the Invention

The present invention relates to a process for producing optical waveguide devices to be used as second harmonic generation devices of a quasi-phase matching type and for use as optical modulators (2) Related Art Statement Devices which are produced by forming optical waveguides on a variety of materials to control light have been researched and developed, and such devices have been assembled into optical communication systems. In particular, a so-called ridge-shaped optical waveguide is expected as an optical modulator, optical switch element, etc. Further, a second harmonic generating (SHG) device of a quasi-phase matched (QPM) type using an optical waveguide made of lithium niobate or lithium tantalate single crystal in which a periodical domain inversion structure is formed has been. The second harmonic generation device may be used as an optical disc memory a variety of applications. For example, in medical applications, photochemical applications, various optical measurements, etc.

Optical waveguides have been formed in the optical waveguide type modulator or the SHG devices using lithium niobate, and quartz glass waveguides on silicon substrate bodies. In such cases, optical waveguides having a ridge-shaped structure have been formed by known etching methods such as RIE (reactive ion etching). More specifically, it is known that such a ridge-shaped structure may be formed by transferring a mask pattern on a substrate workpiece using photolithography, and then removing a portion of the optical waveguide-forming layer, other than the mask pattern, by ion etching or the like.

This process will be briefly outlined with reference to FIGS. 3(a) to 3(b). As shown in FIG. 3(a), an epitaxial film 22 is formed on a substrate body 21 made of an optoelectric single crystal, and a mask 23 having a given pattern is formed on a main plane 22a of the epitaxial film 22. Then, as shown in FIG. 3(b), a ridge-shaped optical waveguide 27 is formed by etching the epitaxial film 22. Since the epitaxial film 22 is removed up to a given depth, excluding a portion not masked, a resulting epitaxial film 24 has a reduced thickness as shown in FIG. 3(b).

However, according to this process, since high energy ions are irradiated upon the substrate body 21, the substrate body 21 is likely to be damaged so that a work damaged layer may be formed in the most important optical waveguide 27 through which light is to be passed. Since the thickness of the work damaged layer amounts to as much as around a few $\mu$m, characteristics of the optical waveguide, for example, refractive index, change due to influences of the work damaged layer. As a result, there is a problem that actual characteristics of the optical waveguide device produced differ from those grasped in the simulation. Further, it has been discovered that since the stability of the optical waveguide decreases, an propagation loss and an extinction ratio of the optical waveguide unfavorably are deteriorated.

Further, since it takes a very long time to entirely and uniformly etch, for example, a 3-inch wafer at a depth of a few microns, this process becomes extremely high cost.

Further, since simulation results of the optical device calculated based on the refractive index, etc. of the material are not coincident with the structure of the optical device actually produced, the light absorption characteristic, the extinction ratio, etc. cannot be sufficiently attained. This is because a top face 26 of the ridge-shaped optical waveguide 27 is substantially flat, but side faces 28 are inclined.

The reason why the side faces 28 of the optical waveguide 27 are inclined is thought as follows. That is, the ridge-shaped optical waveguide 27 projects upwardly from the main plane 24a of the epitaxial film 24. In this case, in order to increase a ratio of d/W in which d and W are a height and a width of the ridge-shaped optical waveguide 27, respectively, to project the ridge-shaped optical waveguide 27 at a large height, it is necessary to etch a surrounding portion of the ridge-shaped optical waveguide 27 as deep as possible. However, since a ratio in etched degree between the substrate body and the mask is ordinarily in a range of 2:1 to 5:1, a mask 23 having a correspondingly increased thickness needs to be used so as to deeply etch the surrounding portion of the ridge-shaped optical waveguide 27. If such a thick mask 23 is used, the etched rate around the mask then decreases, so that a ridge angle "θ" becomes extremely smaller than 90°.

SUMMARY OF THE INVENTION

It is an object of the present invention to prevent the formation of a work damaged layer in an optical waveguide during the production of an optical waveguide substrate with a ridge-shaped structural portion containing at least an optical waveguide. Further, it is another object of the present invention to form such ridge-shaped structural portions in a mass-producing manner in a short time. Further, it is a further object of the present invention to make side faces of the ridge-shaped structural body substantially vertical to a main plane of the ridge-shaped structural portion.

The present invention is directed to a process for producing an optical waveguide substrate comprising a ridge-shaped structural portion containing at least an optical waveguide, said process comprising the steps of forming an optical waveguide-forming layer on a surface of a substrate body to form a substrate workpiece, and forming said ridge-shaped structural portion at said substrate workpiece by grinding.

In working fields using the grinding techniques, various contrivances have been made upon ceramics and single crystal materials. For example, a technique is known in which a truck having a width of about 10 $\mu$m is worked by grinding in the case of a ferrite body for a magnetic head. However, in cases of optical parts and optical devices, such techniques have not been used as practical techniques, and have not been investigated.

The present inventors have discovered that when the above high accuracy grinding step was applied to refractive index controlled optical waveguide substrate each having a ridge-shaped structure, ridge-shaped optical waveguides could be worked and formed at a surprising high working accuracy with small residual strain by machining.

In addition, the present inventors confirmed that when the optical waveguides having the ridge-shaped structure were formed by grinding, an area where a work damaged layer or residual strain was limited to a degree of not more than 0.1 $\mu$m. The inventors have accomplished the present invention based on the above discovery.

These and other objects, features and advantages of the invention will be appreciated when in conjunction with the attached drawings, with understanding that some modifications, variations and changes of the invention could be made by the skilled person in the art to which the invention pertains by the skilled person in the art to which the invention pertains.

BRIEF DESCRIPTION OF THE DRAWINGS

For a better understanding of the invention, reference is made to the attached drawings, wherein:

FIG. 1(a) is a side view showing a state in which an optical waveguide-forming layer 2 is formed on a substrate body, FIG. 1(b) is a side view showing a state in which an intermediate layer 4 and an optical waveguide 3 are successively formed on a substrate body 1 in this order, and FIG. 1(c) is a perspective view schematically showing a state in which a substrate workpiece 5B (5A) is to be ground;

FIGS. 2(a) and 2(b) are front views for showing optical waveguide substrates 11A and 11B, respectively; and FIGS. 3(a) and 3(b) are schematically sectional views for illustrating a conventional process for producing a ridge-shaped optical waveguide.

DETAILED DESCRIPTION OF THE INVENTION

A variety of grinding devices may be used in the present invention. The inventors then discovered that a a high grade micro-grinder can be particularly useful in light of its high mechanical accuracy.

More specifically, the inventors examined the diamond grinding tools for grinding and discovered that a grinding tool using a resin-based binder for the diamond abrasive, (i.e., resinoid grinding tool) may be particularly useful. If a metal bonded grinding tool is used in which a metal is used as a binder, cracking or chipping is formed at an upper portion of the optical waveguide. Because the diamond abrasive is firmly bonded, an upper portion of the ridge-shaped structure is slightly cracked or chipped upon application of very small impact or stress on an edge portion of the ridge-shaped structure. By contrast, the substrate may be excellently ground by a resinoid and metal bonded grinding tool in which a resin and a metal are used as a mixture as a binder.

When the ridge-shaped structure is formed by grinding, it is necessary to dress the grinding tool and true its shape. The inventors discovered that if the grinding tool is dressed and its shape is trued when the grinding tool is set at a grinding machine, especially excellent grinding results. More The use of a piece of equipment called a Cuptruer allows the grinding tool to be dressed and trued on the grinder. The Cuptruer is used for dressing and truing the grinding tool in a very fine adjustment in the state that the grinder is set at the micro-grinder. As to the CUPTRUER, please refer to "TORYUU KAKOU GAKKAISHI" Vol. 39, No. 5, September 1995.

As mentioned above, the ridge-shaped structural body can be obtained with a width accurate within in a range of ±0.2 μm of the ridge of the intended ridge-shaped structural portion. Thus, optical devices having operating characteristics similar to those of computer simulated devices having specified characteristics of the materials, such as refractive index. As a result, the model of the optical waveguide can be obtained.

As to the shape stability of the optical waveguide, according to the conventional reactive ion etching, only the ridge-shaped optical waveguide having a trapezoidal cross sectional shape could be obtained. This is because the side faces of the optical waveguide could only each be worked at an inclination angle of about 70° to 80°. By contrast, according to the working process in the present invention, the ridge-shaped optical waveguides having a rectangular cross section and having the side faces at an angle of 90° (vertical) relative to the top surface of the substrate body can be stably formed.

Further, the optical waveguide substrate can be produced in a sufficiently shorter time by rotating the grinding tool at a high speed and feeding the grinding tool at a high speed, as compared with the reactive ion etching process. Furthermore, a plurality of ridge-shaped structural portions can be simultaneously formed over the entire surface of the substrate workpiece having a wafer shape by using a grinder in which plural rows of the grinding tools are arranged. By so doing, plural chips can be simultaneously formed by working on a single wafer in a short time.

Next, it was discovered that the ridge-shaped structural portion of the substrate can be controlled in its thickness direction by chemical-mechanical polishing ordinarily used in polishing silicon wafers, etc.

In general, the thickness of the single crystal film grown by the liquid phase epitaxial growth varies in a range of ±1.5 μm if the thickness is 15 μm. Therefore, the surface of the optical waveguide-forming layer formed on the substrate body by the liquid phase epitaxial process is finely ground to finally make the thickness of the optical waveguide-forming layer, for example, 11±0.2 μm. As such a fine grinding, an ELID grinding in which grinding is effected while dressing is being effected under electrolysis action may be used. The ELID grinding is a working process in which the grinding tool is subjected to a grinding operation while being dressed by the electrolysis action to improve and stabilize grinding performance. The ELID grinding process is described in "TORYUU KAKOU GAKKAISHI", Vol. 39, No. 5, September, 1995.

Further, the present inventors discovered that the thickness and the surface roughness of the optical waveguide-forming layer can be finished to 10±0.2 μm and 10 Å, respectively, with surprising accuracy by using the chemical-mechanical polishing as a final surface polishing method.

That is, the inventors discovered that the thickness of the optical waveguide-forming layer can be worked to an intended thickness at an extremely high accuracy in a range of ±0.2 μm or less. That is the ridge-shaped optical waveguide substrates having an ideal design can be mass-produced.

Further, since the entire surface of the 3-inch substrate workpiece can be worked at such a high accuracy, an optical waveguide chip can be formed over the entire surface of the substrate body. Therefore, the above process is a working process particularly excellent from the standpoint of the mass productivity.

The application of the above working process upon the oxide type single crystals and the epitaxial films have been mainly explained above, but that process can be also applied to planar circuits using quartz glass waveguides, etc.

As a grinding condition for preparing a ridge-shaped optical waveguide, the following condition is preferred. That is, a resinoid grinding tool is preferred as the grinding tool to be used. For example, if a metal bonded one is used, a substrate body may be largely damaged, so that the propagation loss and the extinction ratio tend to be deteriorated. The particle diameter of the grinding tool is preferably 2 μm to 3 μm. If the particle diameter is less than 1 μm, the grinding power of the grinding tool is small, and the grinding tool is likely to be clogged. To the contrary, if the particle diameter is not less than to 4 μm, pitching is likely to occur and the yield decreases.

The concentration of the grinding tool is preferably 75 to 200. The rotation speed of the grinding tool is preferably 5000 rpm or more, preferably 20000 rpm or more. The feeding speed of a blade is preferably 1–100 mm/min., more preferably 10–30 mm/min. The vibration of a spindle not more than 0.1 μm.

Embodiments of the present invention will be explained below with reference to the attached drawings.

FIGS. 1(a) and 1(b) are front views for illustrating substrate workpieces 5A and 5B to be worked, respectively. First, a substrate body 1 made of a ferroelectric optical single crystal is prepared. Main planes of the substrate body 1 are denoted by 1a, 1d, whereas side planes thereof denoted by 1c, 1d. In the embodiment of FIG. 1(a), an optical waveguide layer 2 is formed on one of the above main faces 1a of the substrate body 1. The optical waveguide layer 2 may be made of an epitaxial film or a vapor deposition film. The refractive index of the optical waveguide layer 2 is greater than that of the substrate body 1.

In the embodiment of FIG. 1(b), an intermediate layer 4 and an optical waveguide layer 3 are successively formed on the main plane 1a of the substrate body 1 in this order. Each of the intermediate layer 4 and the optical waveguide layer 3 may be made of an epitaxial film or an vapor deposition film. In this case, the refractive index of the optical waveguide layer 3 is made larger than that of the intermediate layer 4. The refractive index can be controlled by the composition of intermediate layer.

The surface of each of the optical waveguide layers 2, 3 and the intermediate layer 4 is preferably finely surface polished to a controlled thickness in a given range as mentioned above. Then, as shown in FIG. 1(c), the workpiece 5B (5A) is ground in a direction parallel to an elongate side face 1b. In the embodiment of FIG. 1(c), a rotary 6 provided with a grinding blade is used and advanced as shown by an arrow 8, while being rotated as shown by an arrow 7. Thereby, the substrate body 1, the intermediate body 4 and the optical waveguide 3 are simultaneously ground. At that time, the rotary body 6 is advanced in a direction parallel to the side face 1b.

The substrate workpiece 5B (5A) is ground along broken lines 9. At that time, portions other than a ridge-shaped structural portion to be formed at the substrate workpiece are removed by gradually grinding said portions in a direction from each of the side faces 1b to the broken line 9 through repeatedly reciprocating the rotary body 6 in directions parallel to the side face 1b number times.

By thus forming the ridge-shaped portion through grinding the substrate workpiece, for example, optical waveguide substrates 11A and 11B shown in FIGS. 2(a) and 2(b), respectively, are prepared. In the optical waveguide substrate 11A in FIG. 2(a), a ridge-shaped structural portion 12 is projected from a main plane 10 of the substrate body 10. A base portion 16 of the ridge-shaped structural body 12 is made of a material constituting the substrate body 1, preferably a ferroelectric optical single crystal, and an optical waveguide 13 is formed on the base portion 16. Side faces 16a of the base portion 16 extend substantially perpendicular to the main plane 10 of the substrate body. The side faces 16a continue to respective side faces 13b of the optical waveguide 13. An upper face 13a of the optical waveguide 13 is substantially parallel to the main plane 10 of the substrate body 1.

In the optical waveguide substrate 11B in FIG. 2(b), an intermediate layer 15 is formed on a main plane 10 of the substrate body 1, and a ridge-shaped structural body 18 is formed such that it is projected from a central portion of the intermediate layer 15. A base portion 17 of the ridge-shaped structural portion 18 is made of a material constituting the intermediate layer 15, and an optical waveguide 13 is formed on the base portion 17. Side faces 17a of the base portion 17 extend substantially vertical to the main plane 10 of the substrate body 1, and the side faces 17a of the base portion 17 continue to respective side faces 13b of the optical waveguide 13.

In such optical waveguide substrates, a light beam 14 being propagated through the optical waveguide has an almost circular section with no strain of the light beam. Since the side faces 13b of the optical waveguide 13 are parallel to each other, the sectional shape of the optical waveguide 13 is square or rectangular. Accordingly, symmetry of the light beam 4 is high, and its propagation efficiency becomes maximum.

Optical modulators, optical switch elements, etc. for modifying intensity and phase of the light beam can be produced by using the above optical waveguide substrates. In these cases, shapes of electrodes for modifying the light beam are not particularly limited.

The material of the substrate body is particularly preferably an oxide single crystal. In this case, as the oxide single crystal, one or more kinds of single crystals selected from the group consisting of a single crystal of lithium niobate, a single crystal of lithium tantalate and a single crystal of a lithium niobate-lithium tantalate solid solution are preferably used.

Preferably, one or more kinds of the oxide single crystals selected from the group consisting of lithium potassium niobate and lithium tantalate are used as a preferred example of the above oxide single crystal.

In the present invention, d/W is preferably not less than 2, because in this case, an electric field applied to the optical waveguide in the ridge-shaped structural body is unlikely to spread toward the substrate body. If d/W is not more than 100, the optical waveguide substrate having the ridge-shaped structural portion is easily handled, and the ridge-shaped structural portion is unlikely to be broken during the transportation of the substrate.

EXAMPLES

Example 1

A substrate workpiece as shown in FIG. 1(b) is produced, and a ridge-shaped optical waveguide is formed at this substrate workpiece. That is, an intermediate layer 4 is formed from a single crystal of lithium niobate-lithium tantalate solid solution onto a single crystal substrate body 1 of lithium niobate in the form of a 3-inch wafer size.

The substrate body is held by a holder made of platinum, at its three outer peripheral portions which would constitute parts of a substrate, and a film was formed on the substrate body by horizontally dipping the substrate body in a melt. The composition of the melt charged was 16 mol % $LiNbO_3$-4 mol % $LiTaO_3$-80 mol % $LiVO_3$. The saturation temperature of this melt was about 1050° C. This melt was held and completely homogeneously melted at 1200° C., which was cooled down to 920° C. and held at this temperature for more than 24 hours. During this, an oversaturated amount of $LiNbO_3$ was precipitated as a solid phase, whereas a liquid phase became completely saturated.

Then, the melt was cooled to 910° C., and the wafer was immersed into the liquid phase, thereby forming a film of the single crystal on the substrate body. The time period during which the wafer contacted the melt was set at 16 minutes. A thin film of the single crystal of the lithium niobate-lithium tantalate solid solution having the thickness of about 20 $\mu$m was formed on the wafer. Examination of the thickness distribution of the single crystal thin film on the surface of the wafer revealed that the film thickness was 20 $\mu$m±1 $\mu$m.

Then, the thickness of the lithium niobate-lithium tantalate solid solution single crystal film was reduced to 16 $\mu$m±0.2 $\mu$m over the entire surface of the wafer by finely plane polishing the surface of the film according to the ELID grinding process. After that, the thickness and the surface roughness of the resulting film were reduced to 15 $\mu$m±0.2 $\mu$m and Ra=not more than 10 angstroms, respectively, by chemical-mechanical grinding. Thereby, an intermediate layer 4 was formed.

Next, an optical waveguide-forming layer 3 was formed of a single crystal of lithium niobate according to the liquid phase epitaxial process. The composition of melt charged was 20 mol % $LiNbO_3$-80 mol % $LiVO_3$. The saturated temperature of the melt was about 960° C. This melt was held, and completely homogeneously melt at 1150° C., which was cooled to 905° C., and held at this temperature for not less than 24 hours.

Thereafter, the melt was cooled to 900° C., and the wafer was immersed into the liquid phase, thereby forming a film of the single crystal on the above film. The time period during which the wafer contacted the melt was set at 10 minutes. A thin film of a single crystal of lithium niobate having the thickness of about 10 $\mu$m was formed on the wafer. Examination of the thickness distribution of the single crystal thin film on the surface of the wafer revealed that the film thickness was 10 $\mu$m±1 $\mu$m.

Then, the thickness of the lithium niobate single crystal thin film was reduced to 8 $\mu$m±0.2 $\mu$m over the entire surface of the wafer by finely plane grinding the surface of the film according to the ELID grinding process. After that, the thickness and the surface roughness of the resulting film were reduced to 5 $\mu$m±0.2 $\mu$m and Ra=not more than 10 angstroms, respectively, by the chemical-mechanical polishing process. Thereby, an optical waveguide-forming layer 3 was formed. By the above steps, the intermediate layer having the thickness of 15 $\mu$m and the optical waveguide-forming layer 3 having the thickness of 5 $\mu$m were formed.

Next, a ridge-shaped structural body 18 having a width of 5 $\mu$m and a height of 10 $\mu$m was formed at the surface of the substrate by grinding with a micro-grinder. Then, about 20 devices each having a length of 20 mm and a width of 5 mm were obtained by working the 3 inch-wafer with use of a resinoid grinding tool having an outer diameter of 100 mm, a thickness of 1.2 mm and a grain diameter of 2–3 $\mu$m. A CUPTRUER was used to dress the grinding tool and true its shape, and then the grinding tool was subjected to the above grinding working at 8000 rpm, a feed speed of 20 mm/min.

The time required to form the ridge-shaped structural portion was 30 minutes. The thickness of the work damaged layer was about 0.05 $\mu$m. Evaluation of the thus obtained ridge-shaped thin film optical waveguide revealed that the propagation loss and the extinction ratio were about 0.2 dB/cm and greater than 40 dB at a wavelength of 0.84 $\mu$m, respectively.

Comparative Example 1

In the same way as in Example 1, an intermediate layer 4 and an optical waveguide-forming layer 3 were successively formed on a surface of a substrate body 1 made of a single crystal of lithium niobate in this order. Then, a ridge-shaped structural portion having a width of 5 $\mu$m and a height of 5 $\mu$m was formed by using argon gas according to an ion milling process.

The time required to form the ridge-shaped structural portion was 4 hours. The thickness of the work damaged layer was about 1 $\mu$m. The ridge angle of the thus formed ridge-shaped structural body was about 80°. Evaluation of this ridge-shaped thin film optical waveguide revealed that the propagation loss and the extinction ratio were about 3 dB/cm and greater than 25 dB at a wavelength of 0.84 $\mu$m, respectively. Further, the optical waveguide was optically damaged with 2 mW emitted light, thereby disturbing the light beam pattern.

Example 2

A substrate workpiece as shown in FIG. 1(a) was produced, and a ridge-shaped optical waveguide was formed according to the present invention. That is, a film of titanium was formed, in a thickness of about 500 angstroms, on a substrate body 1 made of lithium niobate and having a 3-inch wafer size by the vapor deposition process. This titanium film was thermally treated at 1050° C. for 10 hours. Thereby, a planar titanium diffused optical waveguide-forming layer 2 was formed.

Next, a ridge-shaped structural body 12 having a width of 10 $\mu$m and a height of 20 $\mu$m was formed at the surface of the substrate by grinding with a micro-grinder (See FIG. 2(a)). Then, about 20 devices each having a length of 20 mm and a width of 5 mm were obtained by working the 3 inch-wafer with use of a resinoid grinding tool having an outer diameter of 100 mm, a thickness of 1.2 mm and a grain diameter of 2–3 $\mu$m. The CUPTRUER was used to dress the grinding tool and true its shape, and then the grinding tool was subjected to the above grinding working at 8000 rpm, a feed speed of 20 mm/min.

The time required to form the ridge-shaped structural portion was 30 minutes. The thickness of the work damaged layer was about 0.05 $\mu$m. Evaluation of the thus obtained ridge-shaped thin film optical waveguide 13 revealed that the propagation loss and the extinction ratio were about 0.2 dB/cm and not less than 40 dB at a wavelength of 1.3 $\mu$m, respectively.

Comparative Example 2

In the same way as in Example 2, a planar titanium diffused optical waveguide layer 2 was formed on a surface of a substrate body 1 made of a single crystal of lithium niobate. Then, a ridge-shaped structural portion having a width of 5 $\mu$m and a height of 5 $\mu$m was formed by using argon gas according to an ion milling process.

The time required to form the ridge-shaped structural portion was 5 hours. The thickness of the work damaged layer was about 0.5 $\mu$m. The ridge angle of the thus formed ridge-shaped structural body was about 75°. Evaluation of this ridge-shaped thin film optical waveguide revealed that the propagation loss and the extinction ratio were about 4 dB/cm and not less than 20 dB at a wavelength of 1.30 $\mu$m, respectively.

As having been explained, according to the present invention, when the optical waveguide substrate with the ridge-shaped structural portion containing at least the optical waveguide is produced, a work damaged layer can be prevented from being formed in the optical waveguide substrate, and the ridge-shaped structural portions can be mass produced in a shorter time. Further, the side faces of the ridge-shaped structural portions can be made almost vertical to the surface of the substrate body.

What is claimed is:

1. A process for producing an optical waveguide substrate comprising a ridge-shaped structural portion containing at least an optical waveguide, said process comprising the steps of:

depositing an optical waveguide forming layer, by liquid phase epitaxial growth, on a substrate body to prepare a substrate workpiece;

plane finishing said optical waveguide forming layer by chemical-mechanical polishing to reduce the thickness of said optical waveguide forming layer to about 3 µm–20 µm; and forming said ridge-shaped structural portion on said substrate workpiece by grinding with a high grade micro-grinder having a diamond abrasive bound thereon by a resin-based binder.

2. The producing process set forth in claim 1, wherein a width of the ridge-shaped structural portion is not less than 3 µm to not more than 20 µm.

3. The producing process set forth in claim 1, wherein when the grinding is to be effected, the micro-grinder is dressed and trued in the state that the micro-grinder is set in a working device.

4. The producing process set forth in claim 1, wherein the substrate body is made of an oxide single crystal.

5. The producing process set forth in claim 4, wherein the oxide single crystal is one or more kinds of single crystals selected from the group consisting of a single crystal of lithium niobate, a single crystal of lithium tantalate and a single crystal of a lithium niobate-lithium tantalate solid solution.

6. The producing process set forth in claim 4, wherein the oxide single crystal is one or more kinds of single crystals selected from the group consisting of a single crystal of potassium lithium niobate and a single crystal of lithium tantalate.

7. The producing process set forth in claim 1, wherein an intermediate layer is formed on the substrate body, and then said optical waveguide-forming layer is formed on the thus formed intermediate layer, the intermediate layer having a refractive index smaller than that of the optical waveguide-forming layer.

8. The producing process set forth in claim 4, wherein an intermediate layer is formed on the substrate body, and then said optical waveguide-forming layer is formed on the thus formed intermediate layer, the intermediate layer having a refractive index smaller than that of the optical waveguide-forming layer.

9. The producing process set forth in claim 5, wherein an intermediate layer is formed on the substrate body, and then said optical waveguide-forming layer is formed on the thus formed intermediate layer, the intermediate layer having a refractive index smaller than that of the optical waveguide-forming layer.

10. The producing process set forth in claim 6, wherein an intermediate layer is formed on the substrate body, and then said optical waveguide-forming layer is formed on the thus formed intermediate layer, the intermediate layer having a refractive index smaller than that of the optical waveguide-forming layer.

* * * * *